US008330468B2

(12) United States Patent
Mizuno

(10) Patent No.: US 8,330,468 B2
(45) Date of Patent: Dec. 11, 2012

(54) VEHICLE CONTROL SYSTEM HAVING AUTOMATIC ENGINE STOP FUNCTION SELECTIVELY ENABLED/DISABLED BASED ON ESTIMATED CHARGE AMOUNT IN BATTERY

(75) Inventor: Satoru Mizuno, Okazaki (JP)

(73) Assignee: Denso Corporation, Kariya (JP)

( * ) Notice: Subject to any disclaimer, the term of this patent is extended or adjusted under 35 U.S.C. 154(b) by 502 days.

(21) Appl. No.: 12/711,631

(22) Filed: Feb. 24, 2010

(65) Prior Publication Data

US 2010/0217484 A1 Aug. 26, 2010

(30) Foreign Application Priority Data

Feb. 24, 2009 (JP) .................................. 2009-040923
Jan. 18, 2010 (JP) .................................. 2010-008347

(51) Int. Cl.
*G01N 27/416* (2006.01)
(52) U.S. Cl. ................... 324/428; 320/132; 324/433
(58) Field of Classification Search .................. 320/132; 324/428, 433
See application file for complete search history.

(56) References Cited

U.S. PATENT DOCUMENTS

| 5,939,861 | A | * | 8/1999 | Joko et al. ..................... 320/122 |
| 6,009,369 | A | * | 12/1999 | Boisvert et al. ................ 701/99 |
| 2002/0014879 | A1 | * | 2/2002 | Koike et al. .................... 320/133 |
| 2002/0130637 | A1 | * | 9/2002 | Schoch .......................... 320/132 |
| 2003/0210056 | A1 | | 11/2003 | Arai et al. |
| 2004/0196005 | A1 | * | 10/2004 | Okui .............................. 320/132 |
| 2007/0052423 | A1 | | 3/2007 | Arai |
| 2007/0090805 | A1 | | 4/2007 | Mizuno et al. |

FOREIGN PATENT DOCUMENTS

| JP | A-2000-323182 | 11/2000 |
| JP | A-2000-324702 | 11/2000 |
| JP | A-2002-155775 | 5/2002 |
| JP | A-2004-45375 | 2/2004 |
| JP | A-2005-147987 | 6/2005 |
| JP | A-2005-172785 | 6/2005 |
| JP | A-2007-121030 | 5/2007 |

OTHER PUBLICATIONS

Notification of Reasons for Rejection for corresponding Japanese Patent Application No. 2010-008347, mailed on Jan. 20, 2011 (w/ English translation).
Jun. 28, 2011 Notification of Reasons for Rejection issued in Japanese Patent Application No. 2010-008347 (with translation).

* cited by examiner

*Primary Examiner* — Samuel Berhanu
(74) *Attorney, Agent, or Firm* — Oliff & Berridge, PLC

(57) ABSTRACT

Each time that starting of a vehicle engine is completed, a vehicle control system derives an estimated amount by which the charge in the vehicle battery is less than a predetermined upper limit value of stored charge, and subtracts the estimated amount from the difference between the upper limit value and a lower limit value of stored charge, to obtain an initial allowable discharge amount. An automatic engine stop/restart function is thereafter enabled or inhibited in accordance with whether a net amount of discharge from the battery, since completion of the preceding engine start, exceeds the initial allowable discharge amount.

17 Claims, 5 Drawing Sheets

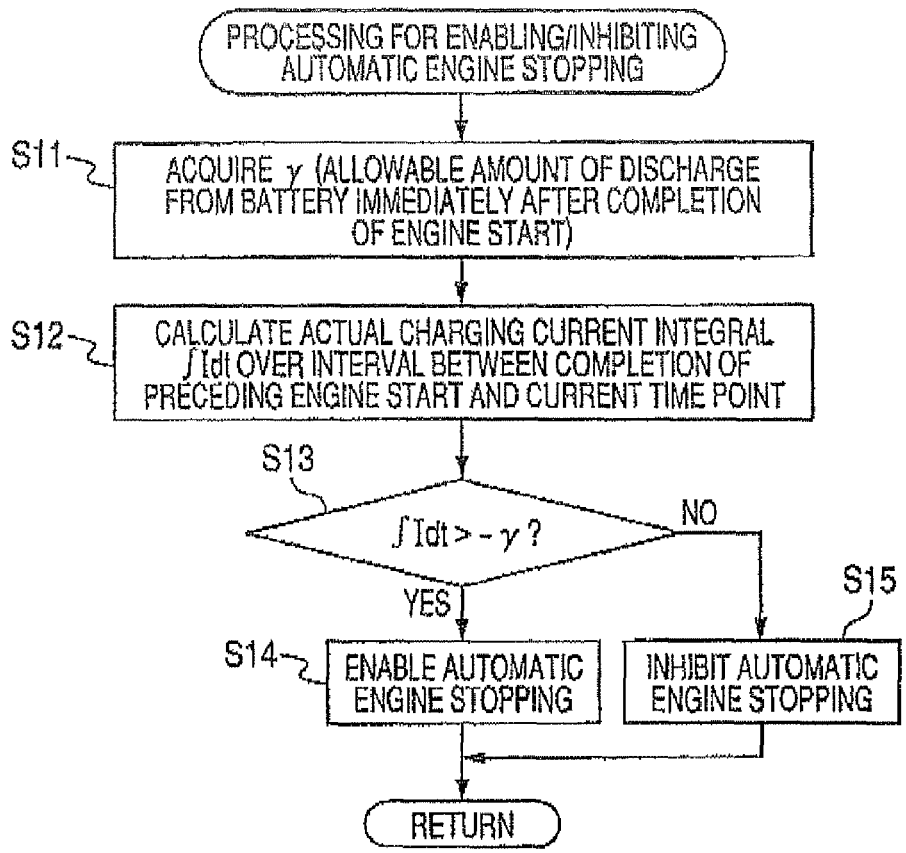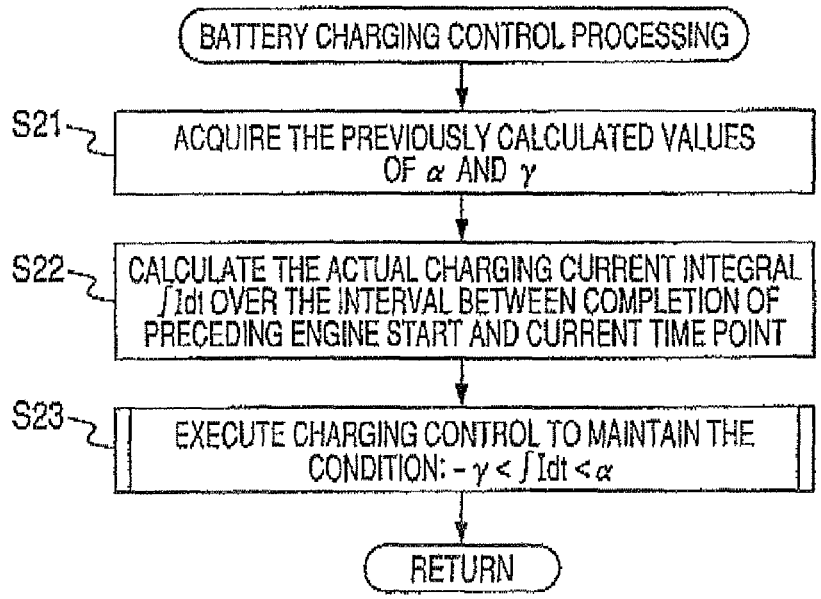

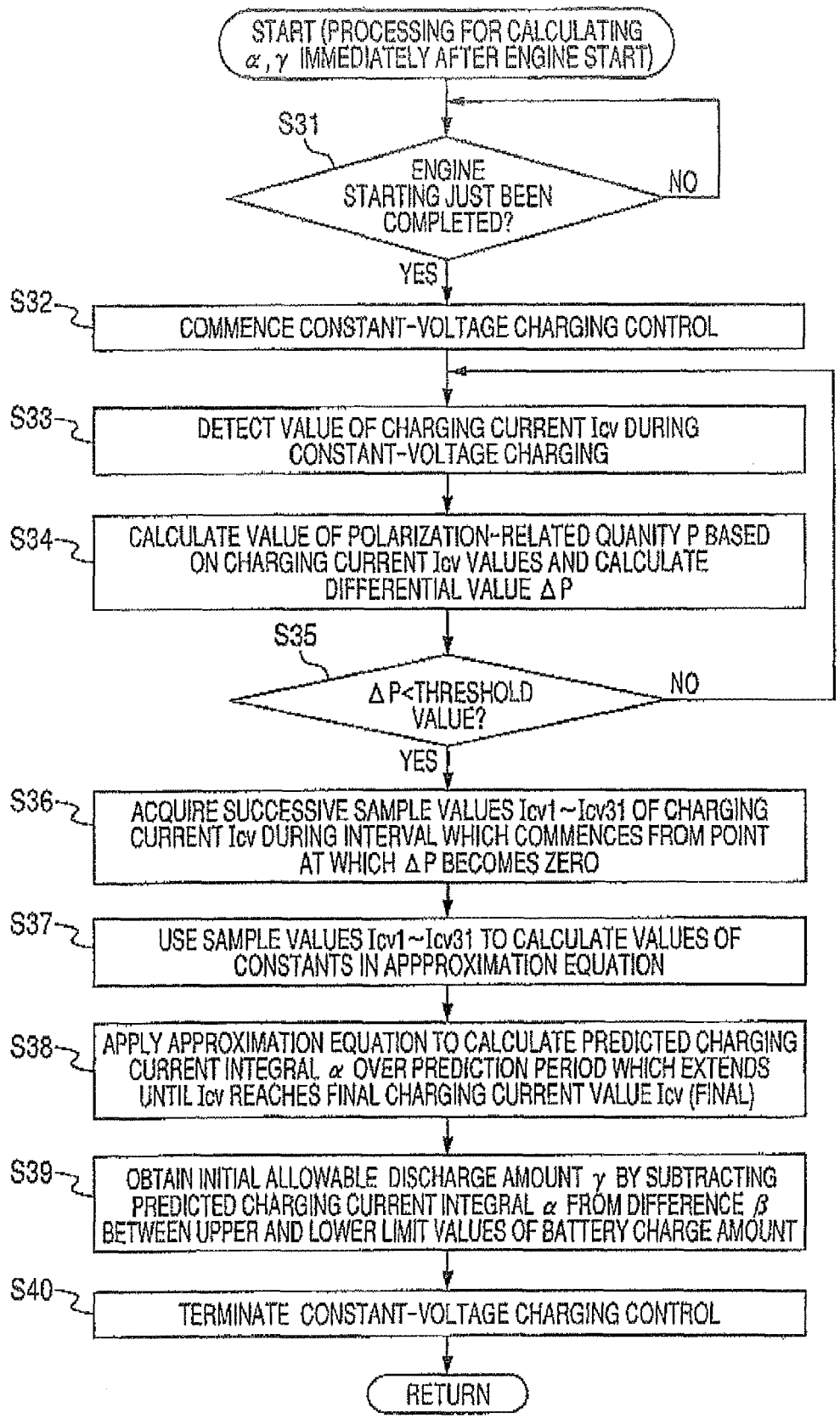

VEHICLE CONTROL SYSTEM HAVING AUTOMATIC ENGINE STOP FUNCTION SELECTIVELY ENABLED/DISABLED BASED ON ESTIMATED CHARGE AMOUNT IN BATTERY

CROSS-REFERENCE TO RELATED APPLICATIONS

This application is based on and incorporates herein by reference Japanese Patent Application No. 2009-040923 filed on Feb. 24, 2009 and Japanese Patent Application No. 2010-008347 filed on Jan. 18, 2010.

BACKGROUND OF THE INVENTION

1. Field of the Invention

The present invention relates to a vehicle control system for a motor vehicle (vehicle powered by an internal combustion engine) having a battery which supplies power for engine starting and is charged by electrical power from an engine-driven generator, the vehicle control system including an automatic engine control apparatus having an automatic engine stop/restart control function which is selectively enabled and disabled based on an estimated condition of charge of the battery, and also including a battery charging control apparatus which operates based on that estimated charge condition.

2. Description of Related Art

It is known to maintain the amount of charge stored in a vehicle battery within a predetermined range, in order to extend the operating life of the battery by ensuring that the battery does not become overcharged or excessively discharged. In recent years, an automatic engine stop control function has come into use for motor vehicles whereby the vehicle engine is automatically stopped when certain predetermined conditions exist (typically, when the engine is idling and the vehicle is halted), and whereby the engine is automatically restarted when some other predetermined condition occurs. Fuel consumption and exhaust gas emissions can thereby be reduced.

During such an automatic engine stop/restart operation (sometimes referred to as an "idling stop"), while the engine is stopped, power is supplied from the battery to electrical loads (various equipment of the vehicle). The amount of charge held in the battery is thereby reduced during the interval in which the engine is stopped. Furthermore during each engine restart, a high level of power is supplied from the battery to drive the starter motor, so that the amount of charge in the battery is further reduced. Hence, when such engine stop/restart operations are repetitively performed, the amount of charge stored in the battery may become excessively low.

For that reason it has been proposed to provide a vehicle control system having such an automatic engine stop function, whereby a lower limit is set on the amount of charge in the battery, and whereby a decision is made as to whether engine automatic stopping will be enabled to be applied (when the necessary conditions are satisfied), based upon that lower limit value.

For example as disclosed in Japanese patent application publication No. 2002-165775, such a system is provided having the following features. Following completion of each engine start, successive values of charge and discharge current to/from the battery are measured and are integrated with respect to time (discharge currents being negative values). Successive values of a charging current integral, i.e., net amount of charge supplied to the battery, are thereby obtained. If the predicted charging current integral at the current point in time is negative, indicating a net amount of discharge has occurred since completion of the preceding engine start, then the engine automatic stop control function is inhibited, whereas that function is enabled so long as the predicted charging current integral is positive.

Hence, the amount of charge remaining in the battery at completion of an engine start operation is set as the lower limit value of battery charge, for the purpose of determining whether to enable or disable the automatic engine stop function.

It is desirable that automatic engine stopping be performed (whenever the necessary conditions are satisfied) as frequently as possible, in order to minimize fuel consumption, i.e., it is desirable that inhibiting of automatic engine stop control should be applied as infrequently as possible.

It is therefore an objective of the present invention to provide a vehicle engine control system having an automatic engine stop control function, whereby the frequency of inhibiting that function (i.e., inhibiting for preventing excessive lowering of the stored charge in the battery) can be reduced by comparison with the prior art, without significantly shortening the operating lifetime of the battery.

SUMMARY OF THE DISCLOSURE

To achieve the above objective, the invention provides a vehicle control system which enables accurate determination of the respective differences between the amount of charge currently held in a vehicle battery and predetermined upper and lower limits of that amount of charge.

From a first aspect of the invention, the difference value information may be utilized by an automatic engine stop control apparatus of the vehicle, for enabling an automatic engine stop function only when the currently stored amount of charge in the battery is higher than the lower limit. Since the currently allowable amount of discharge from the battery while the engine is running difference between the amount of charge currently stored in the battery and the lower limit value of stored charge) can be accurately obtained, the invention enables the automatic engine stop function to be applied more frequently than in the prior art, while ensuring that the battery does not become excessively discharged when automatic engine stopping and restarting is repetitively performed. Alternatively stated, the invention can ensure that the usable lifetime of the battery is not shortened due to repeated execution of the automatic engine stop function.

More specifically, from a first aspect, the invention provides a vehicle control system installed in a motor vehicle having a rechargeable battery, with the vehicle control system incorporating an automatic engine control apparatus having an automatic engine stop control function and with the vehicle control system including judgement circuitry for judging the charge condition of the battery while the vehicle engine is running, and with the automatic engine control system selectively enabling and inhibiting the automatic engine stop control function based upon the battery charge condition.

The judgement circuitry basically operates as follows. At a first time point (while the engine is running) a predicted charging current integral is derived by calculating successive values of a predicted charging current of the battery and integrating these with respect to time, over a prediction interval. The prediction interval extends from the first time point to a final time point, at which the predicted charging current reaches a predetermined final value. The predicted charging current values are calculated assuming a condition of constant-voltage charging of the battery at a predetermined voltage throughout the prediction interval. The charging current final value and predetermined voltage, in combination, correspond to a predetermined amount of charge stored in the battery.

That is to say, when the battery has that predetermined amount of charge stored therein, and the predetermined charge voltage is applied, a charging current will flow which is equal to the aforementioned predetermined final value of charging current.

The predicted charging current integral is subtracted from a difference between predetermined upper and lower limit values of battery stored charge, to obtain an initial allowable discharge amount (i.e., the maximum allowable reduction of the stored charge at the first time point).

Thereafter, at each of successive points in time, an actual current integral is calculated, by time-integrating successive measured values of charge and discharge current of the battery (i.e., positive and negative values of charging current) which have been obtained over an interval extending from the first time point up to the current time point. The automatic engine stop function is enabled only while the actual current integral remains higher than the initial allowable discharge amount, i.e., so long as the actual current integral is not a discharge amount that is equal to or greater than the initial allowable discharge amount.

The initial allowable discharge amount and the predicted charging current integral may be derived immediately after engine starting has been completed. In that case, each time the engine is stopped and restarted, updated values of the initial allowable discharge amount and predicted charging current integral are immediately derived. However it would also be possible to derive updated values of the initial allowable discharge amount and the predicted charging current integral at arbitrarily determined times while the engine is running, and to thereafter utilize these as described above.

The predicted charging current values are preferably derived by applying an approximation equation to a plurality of sample values of the charging current, which have been obtained during an interval in which the charging current is decreasing and in which constant-voltage charging of the battery at a predetermined charge voltage is being applied, e.g., immediately after engine starting has been completed.

In particular in the case of a lead-acid type of storage battery, immediately after engine starting is completed (when a high level of charging current begins to flow into the battery) the level of charging current rapidly decreases, due to charging polarization of the battery. With the present invention, the aforementioned charging current sample values (for use in deriving the predicted charging current values) are preferably acquired only after the charging polarization has reached a stabilized condition. To achieve this, successive values of a charging polarization index are obtained by calculation using successive measured values of charging current, and stabilization of charging polarization is detected as a point at which the rate of change of the charging polarization index reaches a predetermined value.

In that way, the invention enables the approximation equation to be configured such that the predicted charging current values are highly accurate, i.e., are closely identical to corresponding actually measured values (as has been confirmed by experiment). Hence the predicted charging current integral, and thus the initial allowable amount of discharge, can be calculated to a high degree of accuracy. The allowable amount of discharge of the battery can thereby be accurately calculated at any time (while the engine is running) based on the initial allowable discharge amount and the value of the actual current integral at that time. This ensures that the amount of charge stored in the battery can be reliably maintained above the predetermined lower limit value while the engine is running, even if automatic engine stop operations are repetitively executed.

From another aspect, the invention provides a vehicle control system for a vehicle having a rechargeable battery, with the system including a battery charging control apparatus. An initial allowable discharge amount and predicted charging current integral are derived (e.g., immediately after each occurrence of engine starting) as described above, with values of the actual current integral (time-integrated values of measured charge or discharge current of the battery) being successively derived thereafter. The battery charging control apparatus controls the charging current supplied to the battery such as to maintain the amount of charge stored in the battery within the range between the aforementioned upper limit value and lower limit value of stored charge.

Specifically, this is done by controlling the charging current of the battery such that successive values of the actual current integral remain within a range having the predicted charging current integral as an upper limit and having the initial allowable discharge amount as a lower limit.

The invention thereby enables overcharging or excessive discharging of the battery to be reliably prevented, so that the usable lifetime of the battery can be extended.

BRIEF DESCRIPTION OF THE DRAWINGS

FIG. 4 is a flow diagram of processing executed by the embodiment for enabling and inhibiting automatic engine stop control, based on the charge condition of the battery;

FIG. 5 is a flow diagram of processing executed by the embodiment for controlling the amount of charge held in the battery;

FIG. 6 is flow diagram of processing executed by the embodiment to calculate an initial allowable discharge amount from the battery.

DESCRIPTION OF PREFERRED EMBODIMENTS

An embodiment of a vehicle control system incorporating an automatic engine control system and battery control system will be described, referring first to FIGS. 1 and 2.

General Description of Embodiment

The operating lifetime of a battery (i.e., rechargeable storage cell such as a lead-acid battery) which is installed in a vehicle and supplies electrical power for engine starting can be extended by maintaining the amount of charge stored in the battery within an appropriate range. That is, the charge stored in the battery is preferably maintained between predetermined upper limit and lower limit values as illustrated in FIG.

1. The upper limit of the charge amount is determined beforehand by durability tests, and an appropriate difference β between the upper limit value and the lower limit value is similarly determined beforehand through testing.

If the amount of charge remaining in the battery at the current point in time can be accurately estimated, the difference between that amount and the lower limit value of stored charge can be obtained as the currently allowable amount of discharge from the battery, which can be used as a basis for judging whether to enable automatic engine stop operation. However in the prior art. It has been difficult to accurately estimate (at each point in time, while the engine is running) the difference between the specified lower limit value and the amount of charge currently stored in the battery.

The embodiment described in the following enables that difference to be accurately estimated. Specifically, immediately following completion of an engine start operation, processing is performed to predict an amount (designated as α) by which the charge stored in the battery must be increased if that charge amount is to attain the upper limit value of stored charge. That value α is then subtracted from the difference between predetermined upper and lower limits value of stored charge, to obtain an initial allowable discharge amount (designated as γ). This is the maximum amount of discharge from the battery that is allowable immediately following completion of the engine start.

With the present invention, the value α is calculated as a predicted charging current integral. This is obtained by calculating successive predicted values of charging current of the battery, with the calculation assuming a condition of constant-voltage charging at a predetermined charging voltage, and with the charging assumed to continue from a time immediately following engine starting up to a final time point, at which a predetermined value of charging current is reached. These predicted charging current values are integrated with respect to time over the interval which elapses up to the final time point, to obtain the predicted charging current integral α.

Figure 1:
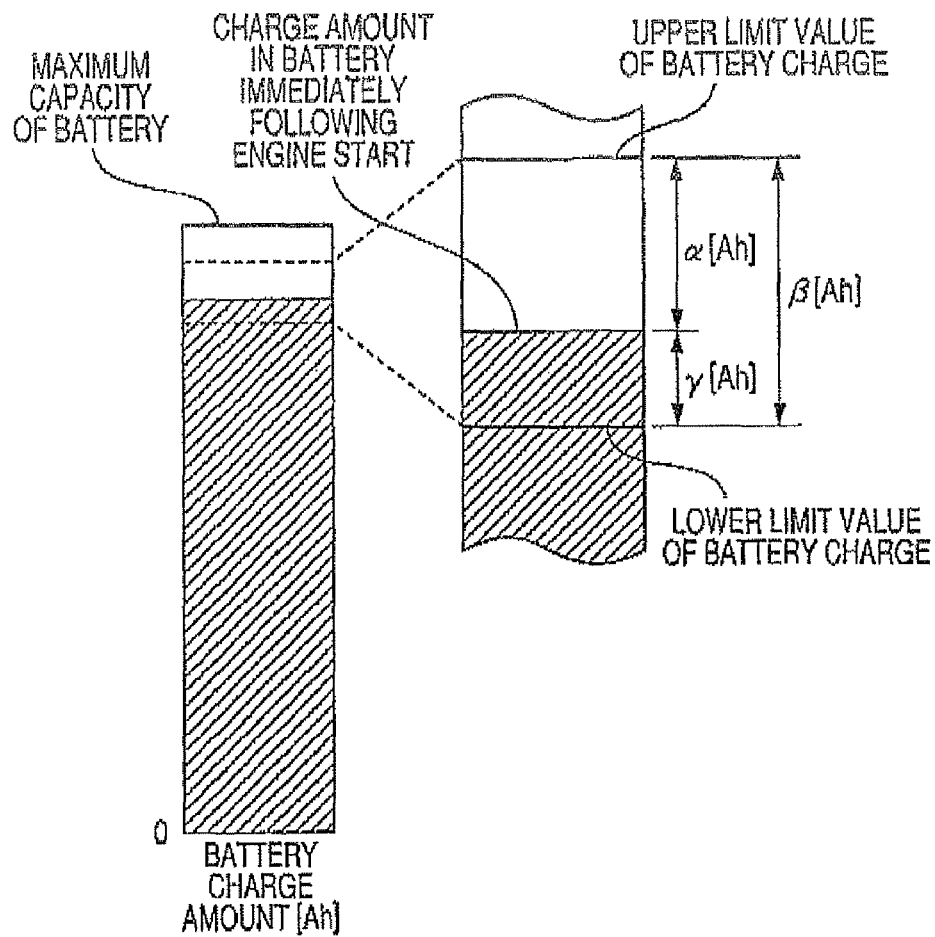
FIG. 1 is a diagram for describing parameters relating to the amount of charge in a vehicle battery immediately following an engine start.

The upper and lower limit values of stored charge in the battery, the predicted charging current integral α, the difference β between the upper and lower limit values of stored charge, the amount of charge remaining in the battery immediately following completion of an engine start (obtained by to subtracting α from the upper limit value), and the initial allowable amount of discharge γ i.e., the difference (β−α), are illustrated in the expanded partial view at the right side of FIG. 1.

In this description, the values α, β and γ are assumed to be measured in units of ampere-hours [Ah].

When respective values of the predicted charging current integral α and the initial allowable discharge amount γ have been derived following completion of an engine start, successive measured values of the battery current are thereafter obtained (charging and discharge current values considered as positive and negative values respectively), and are integrated over a time interval extending from the completion of the engine start (specifically, from the point at which γ is derived, occurring shortly after completion of the engine start) up to the current time point, to obtain successive values of the actual current integral.

Figure 2:
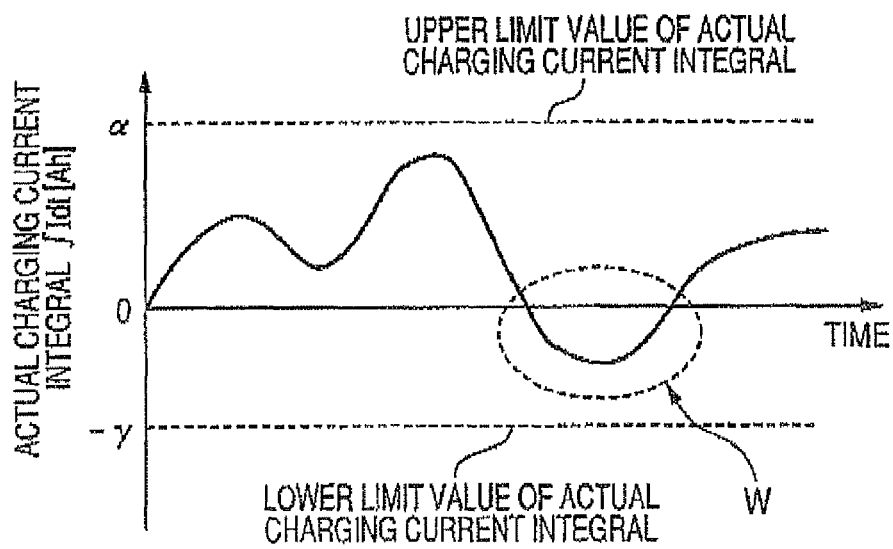
FIG. 2 illustrates time-axis variation of an actual current integral, calculated from successive measured values of charge/discharge current of the battery.

FIG. 2 shows an example of variation of the actual current integral after completion of an engine start. The value of the actual current integral at any specific time point signifies a net amount of increase or decrease of charge (Ah) held in the battery, relative to the amount remaining in the battery immediately following the engine start.

Also as illustrated in FIG. 2, the allowable amount of discharge at any specific time point is the difference between the actual current integral ∫Idt at that point and a lower limit of −γ (i.e., with the initial allowable discharge amount γ expressed as a negative amount of charge). Automatic engine stop control is enabled so long as the actual current integral ∫Idt is higher than that lower limit value thereof, i.e., so long as the net amount of discharge from the battery (since the preceding engine start completion) is less than the initial allowable discharge amount.

With the present invention, automatic engine stop control is enabled even if the actual current integral ∫Idt is a negative value (i.e., a net amount of discharge has occurred since completion of the latest engine start). For example, considering the region of the actual current integral ∫Idt characteristic which is enclosed by the broken-line outline W in FIG. 2, the actual current integral ∫Idt has become negative in that region. However automatic engine stop control is enabled even in such a condition. If the actual current integral ∫Idt is not above the lower limit (−γ), automatic engine stop control is inhibited.

In addition, after an engine start has been completed and values of α and γ have been calculated, the supplying of charging current to the battery is controlled such as to maintain successive values of the actual current integral ∫Idt between the upper and lower limits α and −γ. Overcharging and excessive discharging of the battery can thereby be prevented, since the amount of charge held in the battery is accurately maintained between the predetermined upper and lower limit values of stored charge.

Detailed Configuration of Embodiment

The configuration and operation of the embodiment will be described in greater detail in the following referring first to FIGS. 3 to 7.

Figure 3:
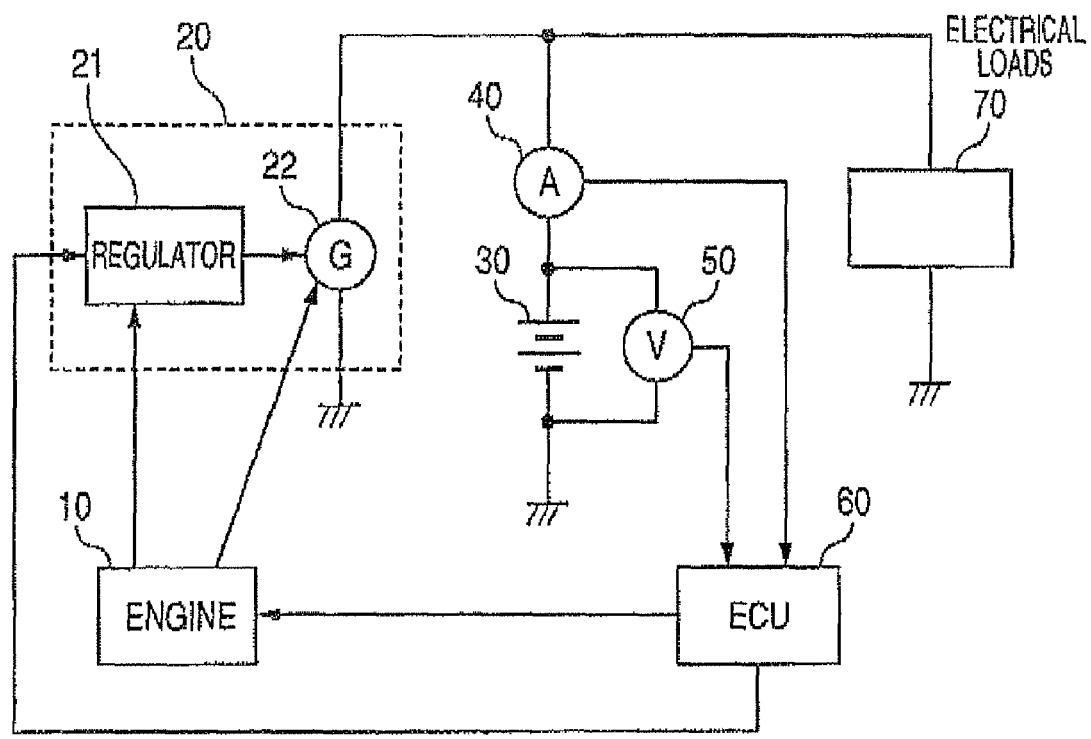
FIG. 3 is a general system block diagram of an embodiment of a vehicle control system incorporating an automatic engine stop control system and a battery control system.

FIG. 3 is a general block diagram showing the overall configuration of the vehicle control system. This consists of an engine 10, a generator apparatus 20, a battery 30, a current sensor 40, a voltage sensor 50, a ECU 60 and a electrical loads 70. The generator apparatus 20 consists of an alternator 22, and a regulator 21 which is a control circuit for controlling the generated voltage of the alternator 22. Here, "alternator" signifies a combination of an AC generator (having a rotor which is mechanically coupled to the crankshaft of the engine 10, to be rotated thereby) whose output voltage is controlled by variation of a field current by the regulator 21, and a rectifier circuit for rectifying that output voltage.

One terminal of the battery 30 is connected via the current sensor 40 to the output terminal of the alternator 22, and is connected in parallel with the electrical loads 70. The battery 30 is a rechargeable storage battery, which may for example be a lead-acid battery, a nickel-hydride battery, a lithium battery, etc., i.e., the invention sets no limit upon the particular type of battery. It is assumed in the following that the battery 30 is a lead-acid battery, as is typically installed in a motor vehicle. During engine starting, power from the battery 30 is supplied to drive a starter motor (not shown in the drawings) of the engine 10.

The current sensor 40 detects the level of charging current being supplied to the battery 30, or level of discharge current being supplied from the battery 30. The voltage sensor 50 detects the terminal voltage of the battery 30. The ECU 60 is based upon a usual type of microcomputer, and includes a non-volatile memory device such as a backup RAM, EEPROM, etc. The ECU 60 executes processing (by execution of a stored control program) far controlling charging of the battery 30, based upon output values provided by the current sensor 40 and the voltage sensor 50. The ECU 60 also controls operation of the engine 10, and in particular with this embodiment the ECU 60 controls automatic stopping (and subsequent restarting) of the engine 10 when predetermined conditions arise, i.e., the "idling stop" function. Since the necessary processing and equipment (e.g., sensors for detecting halting of the vehicle, detecting the engine speed, etc.) associated with such automatic engine stop control are well known, and the function itself does not directly relate to the present invention, description is omitted herein.

FIG. 4 is a flow diagram of a processing routine that is repetitively executed by the ECU 60, for determining whether automatic engine stop control is to be enabled or inhibited (even if the necessary conditions for executing an automatic engine stop exist). In FIG. 4, firstly in step S11 the value γ (initial allowable discharge amount at completion of the most recent engine start, as described above referring to FIG. 1) is acquired. γ has been calculated and stored beforehand by the ECU 60 immediately following the most recent engine start, as described hereinafter referring to FIGS. 6 and 7.

Next in step S12, a measured value of current flow of the battery 30 (charging current, i.e., positive value, or discharge current, i.e., negative value) is obtained from the current sensor 40, and is used in a calculation for updating the actual current integral ∫Idt.

A decision is then made (step S13) as to whether the actual current Integral ∫Idt is higher than the lower limit value thereof (−γ). If the actual current integral ∫Idt is judged to be higher than −γ (YES decision) then the engine automatic stop function is enabled (step S14). If the actual current integral ∫Idt is judged not to be higher than −γ (NO decision), the engine automatic stop function is inhibited (step S15).

So long as that condition continues (i.e., condition whereby there has been a net amount of discharge from the battery 30 since the preceding engine start, and that amount is equal to or greater than the initial allowable discharge amount) the automatic engine stop function remains inhibited even if the necessary "idling stop" conditions become satisfied.

It can thereby be ensured that the amount of charge in the battery 30 will not become excessively reduced as a result of repeated automatic engine stop operations.

Battery charging control performed by the ECU 60 will be described referring to FIGS. 1, 2 and 5. FIG. 5 is a flow diagram of a battery charging control processing routine which is repetitively executed by the ECU 60. Firstly (step S21) the values of α and the γ are acquired, i.e., the values of these which have been previously calculated and stored immediately after the most recent engine start.

Next (step S22) the actual current integral is updated (i.e., is calculated far the period from the end of the most recent engine start up to the present time point). This calculation is identical to that of step S12 of FIG. 4, so that a single processing step may be used in common as steps S12 and S22. For example, each time the actual current integral ∫Idt is updated by executing step S12 of the routine of FIG. 4, the updated value can be stored for use in the next execution of step S23 of the routine of FIG. 5.

The ECU 60 (step S23) then transmits to the regulator 21 the values of α and γ, and the updated value of the actual current integral, and instructs the regulator 21 to control the output voltage of the alternator 22 (and thus control the level of charging current supplied to the battery 30) such as to maintain the actual current integral within a range between an upper limit value which is a charge amount equal to the predicted charging current integral α and a lower limit value which is a discharge amount equal to the initial allowable discharge amount γ. These limit values are illustrated in FIG. 2.

Processing performed for calculating the predicted charging current integral α and thereby calculating the initial allowable discharge amount γ are described in the following referring to FIGS. 6 and 7.

FIG. 6 shows the calculation procedure as a single flow diagram, for ease of understanding. However as described in the following, the calculation is not completed by a single execution of a processing routine, and FIG. 6 is to be understood as illustrating the overall calculation procedure.

Firstly (step S31) a decision is made as to whether starting of the engine 10 has just been completed. Here "starting of the engine 10" includes both the case in which the engine 10 has been started as a result of an ignition switch of the engine 10 being actuated by the vehicle driver, and the case in which the engine 10 has been automatically restarted following an automatic stop.

If it is judged that an engine start operation has just been completed, a YES decision is made, while otherwise (NO decision in step S31), step S31 is repeated, i.e., a wait is performed until a time point is reached which immediately follows completion of an engine start.

If there is a YES decision in step S31, constant-voltage charging control of the battery 30 is initiated, applying a predetermined charging voltage (step S32).

It should be noted that the voltage of the battery 30 may not remain ideally constant while constant-voltage charging control is being applied, but may vary to some extent due to sudden changes in the speed of the engine 10, causing consequent sudden changes in the output voltage of the alternator 22, or due to sudden connection or disconnection of an electrical load to/from the battery 30. Some variations in the output voltage of the alternator 22 may thereby occur, due to limitations of the response speed of field current control of the alternator 22 (i.e., due to the time constant of a control loop).

Next the value of the charging current Icv of the battery 30 at that time is acquired (step S33), then values of a polarization index P and a differential ΔP of the polarization index P are respectively calculated based on the acquired value of Icv (step S34). The polarization index P varies with time as illustrated in the example of FIG. 7B, and is calculated using the following equation:

$$P(n)=P(n-1)+\{I(n)*dt\}-\{P(n-1)*dt/T\} \qquad (1)$$

Here, T is a time constant, and I(n) is the currently obtained value of Icv.

P(n) is the value of P which is calculated in this execution of step 334, while P(n−1) signifies the value of P calculated in the preceding execution of step S34. The period between deriving the present value P(n) and deriving the preceding value (P(n−1)) is fixed as dt, i.e., the period between successive executions of step S34.

In the initial calculation performed using equation (1), P(n−1) is set as zero.

T is a load diffusion time constant of the electrolyte in the battery 30, whose value is obtained beforehand by testing.

As can be understood from equation (1), the currently obtained value P(n) of the polarization index P is derived by calculating the amount by which the charge of the battery 30 has increased during the interval since the preceding calculation of P (i.e., by multiplying the level of charging current I(n) which was supplied to the battery 30 during the interval dt by the value of dt) as {I(n)*dt}, adding that amount of increase to the precedingly calculated value of the polarization index, i.e., P(n−1), and subtracting from the result the amount by which the polarization index P has decreased since the preceding sampling time point up to the present sampling time point (that decrease being calculated as {P(n−1)*dt/T }).

The differential ΔP of the polarization index P with respect to time is expressed by the following equation (2):

$$\Delta P = \{P(n) - P(n-1)\}/dt \qquad (2)$$
$$= I(n-1)^* P(n-1)/\tau$$

Figure 7A:
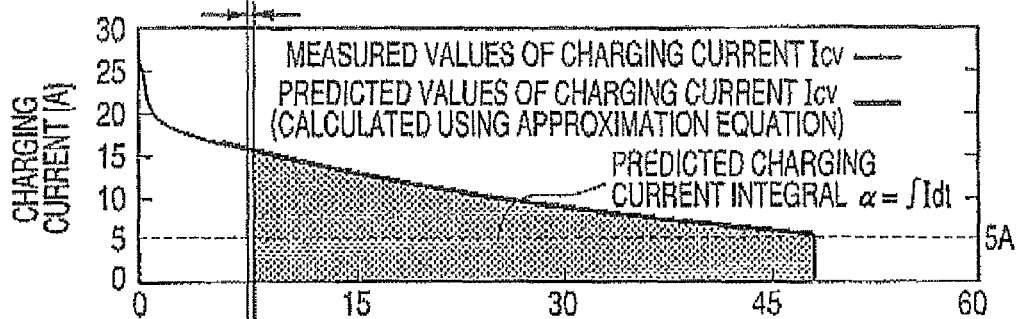
FIGS. 7A, 7B and 7C are diagrams for use in describing the calculation of an amount α as a predicted charging current integral.
Figure 7B:
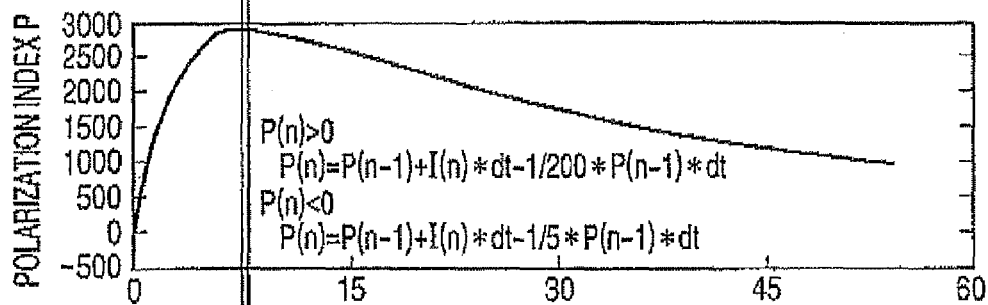
Figure 7C:
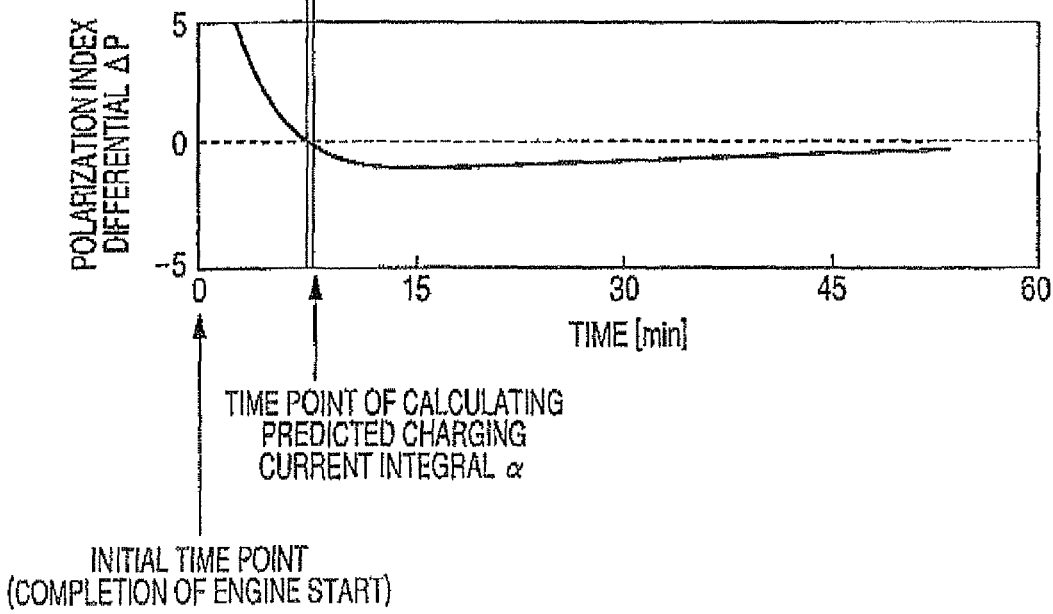

ΔP varies with time as illustrated in the example of FIG. 7C.

Next, a decision is made as to whether the differential ΔP has fallen to a predetermined threshold value (step S35). If ΔP has not yet reached that threshold value (NO in step S35) then step S33 is repeated in the next execution of this processing routine. If ΔP has reached the threshold value, which with this embodiment is zero (YES in step S35) then this is judged as indicating that the charging polarization has become stabilized at a constant degree, and step S36 is then executed.

When constant-voltage charging is started, the charging current of the battery 30 successively decreases from an initial value, with the rate of decrease varying as illustrated in the example of FIG. 7A. The charging current decreases due to successive increases in the amount of charge stored in the battery 30. However in an interval immediately after charging has commenced, the charging current decreases rapidly, as a result of charging polarization. Thus during an initial period after constant-voltage charging is commenced, these two factors determine the rate at which the charging current decreases.

The effects of charging polarization are especially severe in the case of a lead-acid type of battery. However if constant-voltage charging is continuously applied after charging begins, the effects of charging polarization will rapidly end, i.e., with the charging polarization becoming stabilized after a specific interval has elapsed from the start of battery charging. The duration of that interval is determined by the charging voltage.

With this embodiment a decision is made as to whether charging polarization has reached the stabilized condition, based upon whether the rate of variation of the polarization index P (as indicated by the value of the to differential ΔP of the polarization index P) has reached a predetermined value. This is illustrated in FIGS. 7B, 7C. As shown, the stabilized condition is detected as a peak value of the polarization index P, indicated by the value of ΔP falling below zero.

Next (step S37) successive sample values Icv1-Icv31 of the charging is current Idv are acquired, with a fixed period between samples, within a sampling interval Ts having predetermined duration, which commences at the point when the differential ΔP of the polarization index P falls below zero. With this embodiment Ts is set as 30 seconds.

The charging current sample values Icv1-Icv31 are then used (step S37) to derive an approximation equation (3), i.e., to obtain respective values of the constants K, a and b of the approximation equation (3), which is expressed as:

$$I = K + a^* \exp(b^* t) \qquad (3)$$

Here, I denotes the predicted value of charging current of the battery 30 after a time t has elapsed since commencement of constant-voltage charging (unaffected by charging polarization), i.e., during an interval in which the charging current is decreasing substantially exponentially, immediately following completion of engine starting. The predicted values of charging current that are calculated using the approximation equation are used to obtain variation characteristic of the predicted charging current integral during the interval of constant-voltage charging.

Various methods are known for deriving the constant values of such an approximation equation (e.g., least mean square (LMS) method, etc.). With this embodiment, the values are determined based upon experiment beforehand, to provide optimum matching between actual measured values of I and the predicted values obtained by calculation using the approximation equation. It may be possible to set the constant K as 0.

Next, the value α is calculated (step S38), as the predicted amount by which the amount of charge remaining in the battery 30 immediately after engine starting would require to be increased in order to reach the upper limit value of charge, as illustrated in FIG. 1. With this embodiment, the upper limit value is specified as corresponding to a SOC (state of charge) of 90%, i.e., 90% of the maximum storage capacity of the battery 30.

α is calculated as a predicted charging current integral $\int I \cdot dt$ by integrating predicted values of charging current I (obtained by the approximation equation as described above) over a prediction period which commences immediately after completion of an engine start (specifically with this embodiment, commencing when the differential ΔP of the polarization index P falls below zero) and which ends when the predicted charging current reaches a final value Icv(final) at a final time point Tf.

Icv(final) is defined as the value of charging current expected to flow under the condition that the amount of charge stored in the battery 30 is the upper limit value (in this case, a SOC of 90%) and the value of charging voltage used during constant-voltage charging is being applied.

Alternatively stated, the final time point Tf is the time at which the predicted charging current integral α is estimated to reach the predetermined upper limit value of stored charge, during constant-voltage charging by the predetermined charging voltage.

In the example of FIG. 7A, the value calculated for α is indicated by the shaded region below the characteristic.

It can thus be understood that the predicted charging current integral α is a predicted amount by which the charge in the battery 30 would require to be increased (from the charge amount immediately after completion of engine starting) in order to reach the predetermined upper limit value of charge. Hence, the estimated amount of charge remaining in the battery 30 immediately after completion of engine starting is obtained by subtracting α from that upper limit value of charge.

With this embodiment, the voltage applied during constant-voltage charging is 14 V, and the final charging current Icv(final) is 5 A. This value of to Icv(final) is predetermined based on experiment. As described above, the upper limit value of charge is predetermined as a 90% SOC of the battery 30, so that this upper limit corresponds to a combination of a charging current of 5 A and a charging voltage of 14 V.

Next (step S39) as illustrated in FIG. 1, the predicted charging current integral α is subtracted from the difference β between the upper limit value and lower limit values of charge, to thereby obtain the initial allowable discharge amount γ. Constant-voltage charging of the battery 30 is then ended (step S40).

To test the accuracy of the above-described method of calculating predicted charging current values (and thereby deriving the integral α) by using the approximation equation, testing was performed to measure actual successive values of charging current during an interval immediately following completion of engine starting. FIG. 7A shows the results of the testing (with results obtained using the approximation equation indicated as the thick-line portion of the characteristic). As shown, the predicted results obtained by using the approximation equation are substantially identical to the actual measured results.

With this embodiment as described above, $\alpha$ is calculated as a predicted charging current integral $\int I \cdot dt$ by applying an approximation equation to obtain predicted values of charging current. The constant values of the approximation equation are derived using sample values of charging current Icv which are obtained (during an interval Ts of constant-voltage charging) only after charging polarization of the battery 30 has reached a condition of stabilization, following completion of engine starting. This ensures that the predicted charging current integral a can be calculated to a high degree of accuracy by using the approximation equation.

Furthermore by applying constant-voltage charging of the battery 30 until the condition of polarization stabilization has been reached, that condition can be reliably established.

The predicted charging current integral $\alpha$ is then used to accurately obtain the value of $\gamma$ (allowable amount of discharge at time of completion of engine starting), as ($\beta-\alpha$), where $\beta$ is the difference between predetermined upper and lower limit values of charge of the battery 30.

As illustrated in FIG. 1 and FIG. 2 (in which the time-axis origin corresponds to a point substantially immediately following completion of engine starting), the value of the actual current integral $\int I \cdot dt$ at any specific time point represents the estimated amount of change in the stored charge of the battery 30 (since completion of engine starting) at that time, and so long as the actual current integral $\int I \cdot dt$ remains higher than the lower limit value $-\gamma$ (i.e., net amount of discharge is less than the initial allowable discharge amount $\gamma$), it can be ensured that the charge stored in the battery 30 will not fall below the predetermined lower limit amount of charge.

This is true even if the actual current integral $\int I \cdot dt$ attains a negative value, i.e., if the estimated amount of charge remaining in the battery 30 becomes less than the amount at completion of the preceding engine start, so that there has been a net amount of discharge from the battery 30.

Thus by enabling the automatic engine stop function only at times when the net amount of discharge from the battery 30 since the most recent engine start (as expressed by the actual current integral $\int I \cdot dt$) is less than the initial allowable discharge amount (calculated following that engine start), it can be ensured that the battery 30 does not become excessively discharged even if automatic stopping/starting of the engine is repetitively executed. This is reliably ensured since the initial allowable discharge amount $\gamma$ can be derived with a high degree of accuracy, by using the predicted charging current integral $\alpha$.

The invention thereby enables the frequency of inhibiting the automatic engine stop function to be reduced by comparison with the prior art, so that fuel consumption and exhaust gas emissions can be accordingly reduced.

In addition, since the predicted charging current integral $\alpha$ is accurately obtained, so that the level of charge in the battery 30 can be reliably maintained within an appropriate ranged (between the predetermined upper limit and lower limit values of stored charge), this further enables the operating life of the battery 30 to be extended.

Specifically, the charging current of the battery 30 (following an engine start, after values for $\alpha$ and $\gamma$ have been calculated) is controlled such as to maintain the actual current integral in the range between $\alpha$ and $\gamma$. Since a (and hence $-\gamma$) can be highly accurately calculated, the amount of charge stored in the battery 30 can be reliably controlled such as to extend the operating life of the battery.

It will be understood that the processing routine flow diagram of FIG. 6 has been simplified, for ease of understanding the operating principles of the invention. Specifically, after a YES decision has been reached in step S35, the contents of step S36 must thereafter be implemented by a plurality of successive executions of the processing routine, for successively acquiring and storing the sample values Icv1-Icv31 at respective appropriate time points during the interval Ts as described above, for use in step S37. However methods of implementing this will be readily apparent to a skilled person, so that detailed description is omitted.

In the description above referring to FIGS. 7A to 7C, it is assumed that the predicted charging current integral $\alpha$ is estimated over an interval commencing from the point at which the 30-second sampling period is completed, i.e., after stabilization of charging polarization has been detected. However it would be equally possible to use the approximation equation to obtain predicted charging current values with respect to en interval which extends from a preceding time point (i.e., a point immediately following completion of engine starting, when charging polarization stabilization has not yet been reached), to calculate the predicted charging current integral a over that time interval, and thereby calculate the initial allowable discharge amount $\gamma$ as the allowable amount immediately following the completion of engine starting.

Alternative Embodiment

The above embodiment makes use of constant-voltage charging of the battery 30, performed during an interval immediately following engine starting. Although unrelated to the present invention, it is known to perform constant-voltage charging of a vehicle battery during an interval after engine starting. Specifically, the vehicle generator is controlled to set the generated voltage at an appropriately low value, during an engine warm-up period immediately following engine starting. For the purposes of the present invention, it is only necessary to perform constant-voltage charging during the interval (Ts) in which samples of charging current are obtained, for use in calculating the predicted charging current integral $\alpha$. However with an alternative embodiment, the system is not restricted to deriving updated values of the predicted charging current integral $\alpha$ and initial allowable discharge amount $\gamma$ during an interval immediately following engine starting. Specifically, the vehicle control system can be configured to enable constant-voltage charging to be performed (at a predetermined value of charging voltage) during arbitrarily determined intervals while the engine is running normally.

With such an alternative embodiment, calculation of updated values of $\alpha$ and $\gamma$ is performed during each of these arbitrarily determined intervals. That is to say, during each such an interval, sample values of charging current are successively obtained as described for the first embodiment, and used to derive respective values of the constants of the approximation equation. An updated value of the predicted charging current integral $\alpha$ is then calculated using the approximation equation, and an updated value of initial allowable discharge amount $\gamma$ then calculated. Successive values of the actual current integral would thereafter be derived as described for the first embodiment. Hence the operation of such an alternative embodiment would be similar to that of the first embodiment above.

It should be noted that although the invention has been described above referring to specific embodiments, various modifications or alternative configurations of these could be envisaged, which fall within the scope claimed for the present invention.

It should further be noted that the invention is not restricted in application to a vehicle control system incorporating an automatic engine stop apparatus. Since the invention enables the currently allowable amount of discharge from a vehicle battery to be accurately estimated, the invention would be applicable to battery charging control in a vehicle which does not utilize an automatic engine stop function, with values of the predicted charging current integral α and initial allowable discharge amount γ being derived immediately after the engine has been started (by ignition switch-on performed by the driver). Control of charging the vehicle battery would thereafter be performed by maintaining the actual current integral at values between the upper and lower limit values of α and −γ respectively, as described for the first embodiment referring to FIG. 5.

What is claimed is:

1. A vehicle control system installed in a motor vehicle having a rechargeable battery, said vehicle control system incorporating an automatic engine control apparatus having an automatic engine stop function and said vehicle control system comprising judgement circuitry configured to judge a charge condition of said battery and to selectively enable and inhibit said automatic engine stop function based upon said charge condition;
   wherein said judgement circuitry is configured to:
   at a first time point while said engine is running, calculate a predicted charging current integral by calculating successive values of a predicted charging current of said battery within a prediction interval extending from said first time point to a final time point at which said predicted charging current attains a predetermined final value, and integrating said predicted charging current with respect to time over said prediction interval, to obtain a predicted charging current integral, said predicted charging current values being calculated assuming a condition of constant-voltage charging of said battery at a predetermined voltage throughout said prediction interval, and said charging current final value and said predetermined voltage, in combination, being indicative of a predetermined value of charge stored in said battery,
   subtract said predicted charging current integral from a difference between a predetermined upper limit value and a predetermined lower limit value of charge stored in said battery, to obtain an initial allowable discharge amount, and
   subsequent to said first time point, calculate an actual current integral by integrating successive measured values of charge and discharge current of said battery with respect to time, from said first time point up to a current time point;
   said judgement circuitry being configured to selectively enable and inhibit said automatic engine stop function, subsequent to said engine starting, based upon said actual current integral in conjunction with said initial allowable discharge amount.

2. A vehicle control system according to claim 1, wherein said judgement circuitry is configured to selectively enable and inhibit said automatic engine stop function in accordance with whether or not said actual current integral is higher than a lower limit value thereof, and
   said lower limit value corresponds to an amount of discharge from said battery, since said first time point, equal to said initial allowable discharge amount.

3. A vehicle control system according to claim 1, wherein said judgement circuitry is configured to calculate said predicted charging current values based upon values of said charging current obtained while said charging current is successively decreasing and said constant-voltage charging by said predetermined voltage is being applied.

4. A vehicle control system according to claim 1, wherein said judgement circuitry is configured to:
   obtain a plurality of sample values of said charging current during a sampling interval of predetermined duration in which said charging current is successively decreasing and said battery is being charged at said predetermined constant voltage, said sampling interval occurring immediately prior to said first time point; and
   calculate said predicted charging current values based upon said sample values.

5. A vehicle control system according to claim 4, wherein said sample values of charging current are successively acquired with a fixed period between successive sample values, and wherein said judgement circuitry is configured to
   calculate respective values of constants of an approximation equation based upon said plurality of sample values of charging current, and
   perform calculations using said approximation equation and said sample values of charging current, to obtain said predicted charging current values.

6. A vehicle control system according to claim 1, wherein said judgement circuitry is configured to selectively enable and inhibit said automatic engine stop function based upon said initial allowable discharge amount in conjunction with said actual current integral as derived over an interval extending from completion of starting said engine up to a current point in time.

7. A vehicle control system according to claim 6 wherein said judgement circuitry is configured to:
   obtain a plurality of sample values of said charging current during a sampling interval of predetermined duration immediately following said engine starting completion, in which said charging current is successively decreasing and said battery is being charged at said predetermined constant voltage, and
   calculate said predicted charging current values based upon said sample values.

8. A vehicle control system according to claim 7, wherein said judgement circuitry is configured to:
   detect a condition of stabilization of charging polarization of said battery within an interval immediately following said completion of engine starting, and
   commence acquiring said sample values of charging current when said stabilization condition has been detected.

9. A vehicle control system according to claim 8, wherein said judgement circuitry is configured to:
   acquire successive values of said charging current under said condition of constant-voltage charging, during said interval immediately following completion of engine starting, and apply said acquired values of charging current to calculate successive values of a charging polarization index (P) that is indicative of an extent of said charging polarization;
   compare a rate of change of said charging polarization index (P) with a predetermined threshold value of rate of change; and
   when said threshold value is judged to have been reached, commence said sampling interval of acquiring said plurality of sample values of charging current.

10. A vehicle control system installed in a motor vehicle having a rechargeable battery, said vehicle control system comprising judgement circuitry configured to judge a charge condition of said battery and a battery charging control apparatus configured to control a charging current of said battery based upon said charge condition;

wherein said judgement circuitry is configured to:

at a first time point while said engine is running, calculate a predicted charging current integral by calculating successive values of a predicted charging current of said battery with respect to a prediction interval, said prediction interval extending from said first time point to a final time point at which said predicted charging current attains a predetermined final value, and integrating said predicted charging current over said prediction interval to obtain a predicted charging current integral, said predicted charging current values being calculated assuming a condition of constant-voltage charging of said battery at a predetermined voltage throughout said prediction interval, and said charging current final value and said predetermined voltage, in combination, being indicative of a predetermined value of charge stored in said battery, subtract said predicted charging current integral from a difference between a predetermined upper limit value and a predetermined lower limit value of charge stored in said battery, to obtain an initial allowable discharge amount expressing a maximum allowable reduction of said stored charge at said first time point, and subsequent to said first time point, calculate an actual current integral by integrating successive measured values of charge and discharge current of said battery from said first time point up to a current time point;

and wherein said battery charging control apparatus is configured to control a charging current of said battery based upon said initial allowable discharge amount and said actual current integral.

11. A vehicle control system according to claim 10 wherein said battery charging control apparatus is configured to apply said charging control for maintaining successive values of said actual current integral between an upper limit which is an amount of charge equal to said predicted charging current integral and a lower limit which is an amount of discharge equal to said initial allowable discharge amount.

12. A vehicle control system according to claim 11, wherein said judgement circuitry is configured to derive said actual current integral over an interval extending from completion of starting said engine up to a current point in time.

13. A vehicle control system according to claim 10, wherein said judgement circuitry is configured to calculate said predicted charging current values based upon values of said charging current obtained while said charging current is successively decreasing and said constant-voltage charging by said predetermined voltage is being applied.

14. A vehicle control system according to claim 10, wherein said judgement circuitry is configured to:

obtain a plurality of sample values of said charging current during a sampling interval of predetermined duration in which said charging current is successively decreasing and said battery is being charged at said predetermined constant voltage; and calculate said predicted charging current values based upon said sample values.

15. A vehicle control system according to claim 14, wherein said sample values of charging current are successively acquired with a fixed period between successive sample values, and wherein said judgement circuitry is configured to calculate respective values of constants of an approximation equation based upon said plurality of sample values of charging current, and perform a calculation using said approximation equation and said sample values of charging current, to obtain said predicted charging current values.

16. A vehicle control system according to claim 14 wherein said sampling interval occurs following completion of starting said engine, and wherein said judgement circuitry is configured to detect a condition of stabilization of charging polarization of said battery within an interval immediately following said completion of engine starting, and commence acquiring said sample values of charging current immediately after said stabilization condition has been detected.

17. A vehicle control system according to claim 16, wherein said judgement circuitry is configured to:

acquire successive values of said charging current during said condition of constant-voltage charging, and apply said acquired values of charging current to calculate successive values of a charging polarization index (P) that is indicative of an extent of said charging polarization;

compare a rate of change of said charging polarization index (P) with a predetermined threshold value of rate of change; and when said threshold value is judged to have been reached, commence said sampling interval of acquiring said plurality of sample values of charging current.

* * * * *